United States Patent
Overton

(10) Patent No.: US 7,832,037 B2
(45) Date of Patent: Nov. 16, 2010

(54) BABY CHANGING SYSTEM FOR AUTOMOBILES

(76) Inventor: Rachel G. Overton, 6 Oak La., Old Greenwich, CT (US) 06870-2011

( * ) Notice: Subject to any disclaimer, the term of this patent is extended or adjusted under 35 U.S.C. 154(b) by 62 days.

(21) Appl. No.: 12/473,581

(22) Filed: May 28, 2009

(65) Prior Publication Data

US 2010/0050338 A1    Mar. 4, 2010

Related U.S. Application Data

(60) Provisional application No. 61/092,507, filed on Aug. 28, 2008.

(51) Int. Cl.
*A47D 7/04* (2006.01)
*A45F 3/22* (2006.01)

(52) U.S. Cl. .................. 5/655; 5/94; 5/98.3; 5/122; 5/127

(58) Field of Classification Search ........... 5/94, 5/98.3, 118, 120, 122, 123, 127, 655; 108/50.17, 108/37; 160/301, 302
See application file for complete search history.

(56) References Cited

U.S. PATENT DOCUMENTS

| | | | |
|---|---|---|---|
| 400,131 A | | 3/1889 | Small |
| 1,204,416 A | * | 11/1916 | Doser ............... 5/94 |
| 1,394,578 A | * | 10/1921 | Purcell ............ 5/118 |
| 1,661,580 A | * | 3/1928 | Scholl ............. 5/118 |
| 1,749,888 A | * | 3/1930 | Reeder ............ 5/122 |
| 1,925,607 A | * | 9/1933 | Rottmer .......... 5/118 |
| 2,536,592 A | | 1/1951 | Caeser et al. |
| 2,688,998 A | | 9/1954 | Erickson et al. |
| 3,037,216 A | * | 6/1962 | Stringer .......... 5/118 |
| 3,152,835 A | | 10/1964 | McKie |
| 4,118,066 A | | 10/1978 | Ricke |
| 4,320,922 A | | 3/1982 | Meritis |
| 4,458,738 A | | 7/1984 | Wilson |
| 4,790,592 A | | 12/1988 | Busso et al. |
| 5,054,533 A | | 10/1991 | Lii |
| 5,170,521 A | * | 12/1992 | Light ............... 5/118 |
| 5,690,317 A | * | 11/1997 | Sandsborg ....... 256/1 |
| 6,327,726 B1 | | 12/2001 | Weber |
| 6,382,720 B1 | | 5/2002 | Franklin et al. |
| 6,421,856 B1 | | 7/2002 | Furnback |
| 6,581,228 B1 | * | 6/2003 | Boskovich et al. ...... 5/655 |
| 6,616,237 B2 | | 9/2003 | Sonner et al. |
| 6,746,069 B1 | | 6/2004 | McKenzie |
| 7,040,257 B2 | | 5/2006 | Waxman et al. |
| 7,185,694 B2 | | 3/2007 | Dunn et al. |
| 7,210,738 B1 | | 5/2007 | Mahaffy |
| 7,219,709 B1 | * | 5/2007 | Williams ........ 160/24 |
| 7,438,112 B2 | * | 10/2008 | Cheng ............ 160/24 |
| 2006/0150324 A1 | | 7/2006 | Jackson et al. |

* cited by examiner

OTHER PUBLICATIONS

International Search Report and Written Opinion of the International Searching Authority; PCT/US2009/050452; Aug. 31, 2009; 9 pages.

*Primary Examiner*—Michael Trettel
(74) *Attorney, Agent, or Firm*—St. Onge Steward Johnston & Reens LLC

(57) ABSTRACT

A stowable baby changing system including a housing having a mount connectable to a first automobile seat, a sheet extendable from the housing over and above a seating surface of a second automobile seat, a locking mechanism for fixing the sheet in an extended position, and one or more attachments on a distal end of the sheet to secure the sheet over the seating surface, wherein the sheet is suspended above the seating surface in the extended position providing a clearance between the sheet and the seating surface.

22 Claims, 12 Drawing Sheets

BABY CHANGING SYSTEM FOR AUTOMOBILES

CROSS-REFERENCE TO RELATED APPLICATIONS

The present application claims the benefit under 35 U.S.C. §119(e) of the U.S. Provisional Patent Application Ser. No. 61/092,507, filed on Aug. 28, 2008, the content of which is incorporated herein by reference.

FIELD OF THE INVENTION

The invention relates to retractable changing hammock, and more specifically to a baby changing system and method for use in automobiles.

BACKGROUND OF THE INVENTION

Due to existing laws requiring children's car seats in passenger vehicles, bulky cargo such as children's strollers, and the resulting lack of space inside a vehicle, it is often difficult to change a child's diaper in vehicles. Oftentimes an adult is forced to change a child on the ground outside a vehicle, which is unsafe and where the adult and child are subjected to harsh outdoor elements, or must take the time to look for an establishment with a changing table, or must create space inside the vehicle by either removing car seats or creating space in the trunk/rear of the vehicle by temporarily removing cargo to make room for a diaper changing area.

Even if rear space is available in a vehicle, given the limited about of space, changing a child on a vehicle's seat can pose a danger since the child may roll right off. Leaning over to change a child on the seat of a vehicle also puts strain on the adult's back. Changing a child's diaper inside the vehicle on the rear seat or within a trunk or tailgate area can also be messy as doing so can soil the vehicle with excrement or diaper creams. To avoid this, an adult often needs a towel or protective cover to protect the vehicle.

Some efforts have been made to provide changing systems for passenger vehicles. For example, U.S. Pat. No. 6,327,726 to Weber discloses a baby-changing pad for use in a motor vehicle. The pad secures between a front seat and a back seat of the vehicle and rests on the back seat during use. The pad disclosed in Weber provides some protection against soil or mess on the seating surface. However, use of the pad disclosed in Weber requires an open space on the rear seat of the vehicle which may not be available when child seats are installed in the vehicle.

U.S. Pat. No. 6,421,856 to Furnback discloses a baby changing table for automobiles. The table includes a rigid frame that is hinged to lower across the back seat of the automobile. The table may be secured around a headrest of the front seat. U.S. Patent Application Publication No. 2006/0150324 to Jackson et al. similarly discloses baby changing table with a rigid hinged frame that attaches to the back of an automobile seat. However, both Furnback and Jackson require rigid changing tables that are bulky and use up additional much needed space within the vehicle. Furthermore, the changing tables disclosed in Furnback and Jackson may pose safety risks by requiring a rigid and bulky structure in front of or near a child's car seat.

It is therefore desired to provide baby changing system for passenger vehicles that requires minimal space in the vehicle and that may be used even when an open seat or tailgate space is not available. It is also desired to provide a baby changing system for passenger vehicles that is readily stowable in the vehicle without posing safety risks to passengers.

SUMMARY OF THE INVENTION

Accordingly, it is an object of the present invention to provide a baby changing hammock that can be used over any existing obstacles on a rear seat within a vehicle's cabin, such as installed car seats or infant carrier bases, thereby providing valuable space to change a child's diaper.

It is a further object to provide a small and lightweight baby changing hammock that is retractable in or about a housing to enable easy stowing without using a significant amount of space in the vehicle and without posing a safety hazard to vehicle occupants.

These and other objectives are achieved by providing a baby changing system including a housing or roller mountable to the rear of a front automobile seat including a retraction mechanism and a locking mechanism, a sheet about the roller including one or more attachment mechanisms on its distal end for attaching to a rear automobile seat opposite to the front automobile seat, wherein the sheet is extendable over a portion of the rear seat and lockable in the extended position by means of the locking mechanism, and wherein the sheet is retractable after use by means of the retraction mechanism.

Other objectives are achieved by providing a baby changing system, including a housing including a mount connectable to a first automobile seat, a sheet extendable from the housing over and above a seating surface of a second automobile seat, a locking mechanism for fixing the sheet in an extended position, and one or more attachments on a distal end of the sheet to secure the sheet over the seating surface. The sheet may be suspended above the seating surface in the extended position providing a clearance between the sheet and the seating surface. In some embodiments, the mount includes two or more straps connectable about a portion of the first automobile seat.

Further provided is a baby changing system including a housing having a mount to fix the position of the housing, the housing including a roller. The changing system includes a continuous sheet connected to the housing, the sheet extendable from the housing and retractable about the roller, a locking mechanism for fixing the sheet in an extended and elevated position, one or more attachments on a distal end of the sheet to fix a position of the distal end, and a retraction mechanism to retract the sheet into the housing and about the roller. The sheet includes two longitudinal sides and the sheet may be curved in the extended position such that the longitudinal sides are above a center of the sheet.

In some embodiments, the housing is fixed to a back portion of a first automobile seat, wherein the one or more attachments attach to a second automobile seat behind the first automobile seat, wherein the sheet is extendable over a portion of the second seat and lockable in the extended position elevated over the second seat by means of the locking mechanism, and wherein the sheet is retractable after use by means of the retraction mechanism. The sheet may be suspended above the seating surface in the extended position providing a clearance between the sheet and the seating surface.

Other objectives are achieved by providing a method of changing an infant in an automobile, including the step of providing a changing system including a housing having a mount, a sheet extendable from the housing, one or more attachments on a distal end of the sheet, and a locking mechanism for fixing the sheet in an extended position. The method includes extending the sheet from the housing over and above a seating surface of an automobile seat, locking the sheet in the extended position via the locking mechanism, attaching the sheet over the seating surface of the automobile seat via the attachments, wherein the sheet is suspended above the seating surface, and placing the infant on the extended sheet. In some embodiments, the automobile seat includes a child seat and/or infant carrier base on the seating surface, wherein the sheet is suspended above the child seat and/or infant carrier base.

The changing system according to the present invention enables the adult and child to avoid any of the inconveniences and dangers associated with prior art systems since it creates space inside the vehicle to safely and comfortably change a child's diaper while leaving all existing cargo, including children's car seats, in place. With a trend towards smaller, fuel efficient vehicles, space will be even more limited in passenger vehicles, and the changing hammock creates newly found space inside the vehicle. The present invention also avoids the need to bring along a towel or other protective cover and keeps the vehicle from being soiled by holding the child above the vehicle's seats.

Other objects of the invention and its particular features and advantages will become more apparent from consideration of the following drawings and accompanying detailed description.

DETAILED DESCRIPTION OF THE INVENTION

Figure 1:
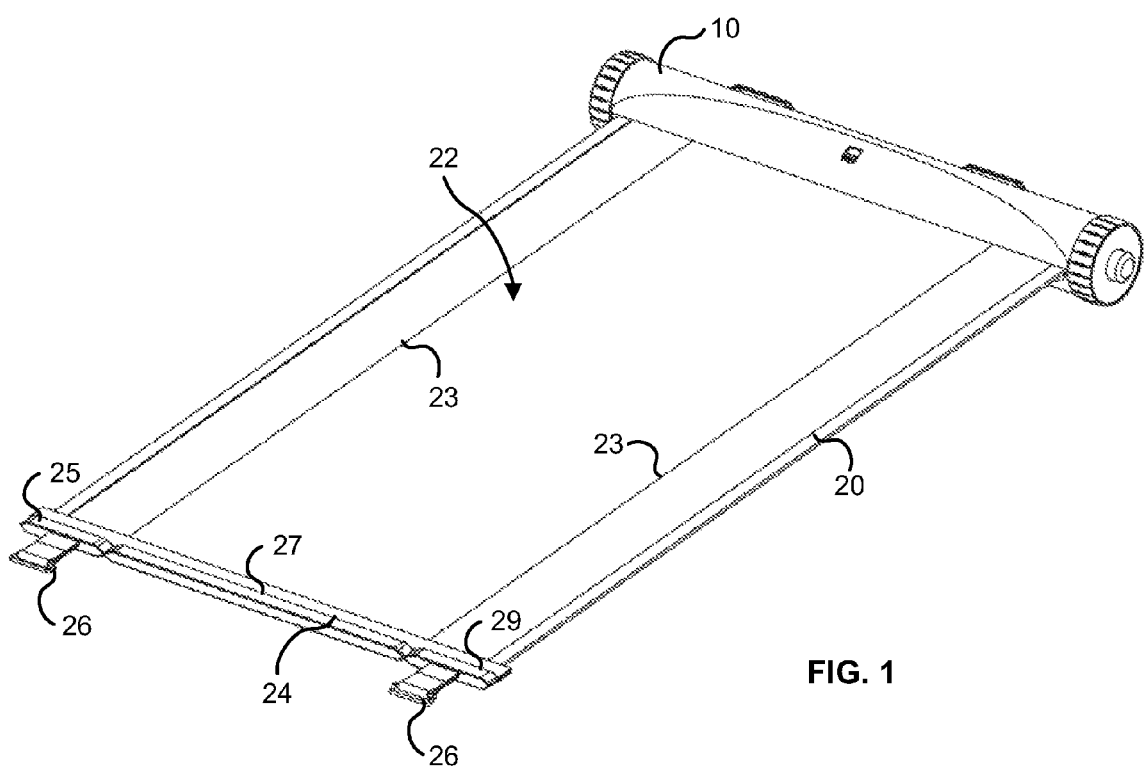
FIG. 1 is a front perspective view of a baby changing system according to an exemplary embodiment of the present invention in an extended position.

FIG. 1 shows a baby changing system according to an exemplary embodiment of the present invention in an extended position. The changing system according to the present invention may be useful in a number of applications, but is especially useful for changing an infant or child in an automobile. The changing system includes a housing or casing 10 that is removeably attachable within the automobile. For example, the housing may be attached to or about the rear of a front seat of the vehicle by means of one or more attachment mechanisms.

The system includes a hammock or sheet 20 including a top surface 22. The hammock 20 includes a flexible material such as a fabric or woven material. In the exemplary embodiment, the hammock 20 is a continuous sheet, without holes or openings, to safely hold an infant or child. The material is preferably substantially non-elastic or minimally elastic, or has substantially non-elastic or minimally elastic portions, to prevent substantial sagging of the hammock 20 below a preferred height during use. In some embodiments, the material is also stain and/or moisture resistant. The hammock 20 may be any desired size, e.g., according to the size of child to be changed and/or the available space in the automobile. In the exemplary embodiment, the hammock 20 has a width of approximately 20 to 22 inches and a length of at least 36 inches.

The hammock 20 is extendable from the housing 10 to an extended position or attachment point, such as the rear seat of an automobile or a portion of a child seat. The hammock 20 includes attachment mechanisms 26 such as, e.g., one or more straps or hooks on a distal end 24 of the hammock 20. In some embodiments, the attachment mechanisms 26 includes one or more LATCH connectors adaptable to connect to one or more LATCH anchors behind and/or above a rear automobile seat.

The distal end 24 of the hammock 20 may include a fabric edge or seam of the hammock 20. However, in some embodiments, the distal end 24 includes a rigid or semi rigid (e.g., polymer or aluminum) edge or stiffener to provide support and shape to the distal end 24. The edge may be straight or curved (e.g., down and/or toward the back of the housing 10), to shape and raise the longitudinal sides of the hammock 20 and assist in retaining children on the hammock 20. As shown in FIG. 1, the distal edge 24 may include a segmented or hinged stiffener having three linear segments 25/27/29 allowing the edge to curve by bending between the segments to provide a cradling effect. The linear segments 25/27/29 may be separate from one another, or connected by an area of reduced thickness. The hammock 20 may similarly have seams 23 and be segmented accordingly to further provide the cradling effect. In some embodiments, the longitudinal sides of the hammock 20 are at least 2 inches above a center of the hammock 20 in the extended position.

Figure 2A:
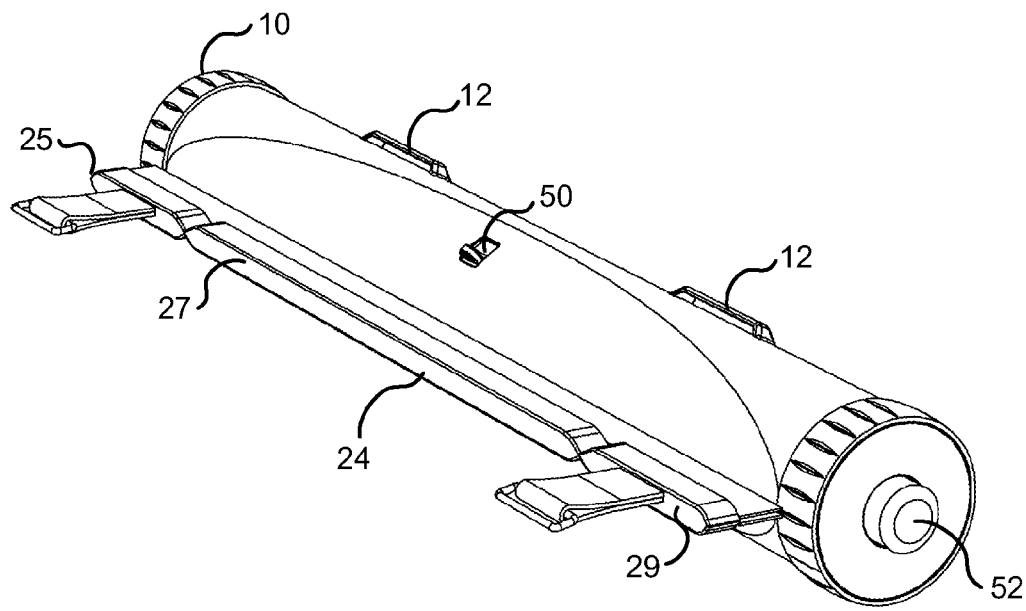
FIG. 2A is a front perspective view of a baby changing system according to an exemplary embodiment of the present invention in a retracted position.
Figure 2B:
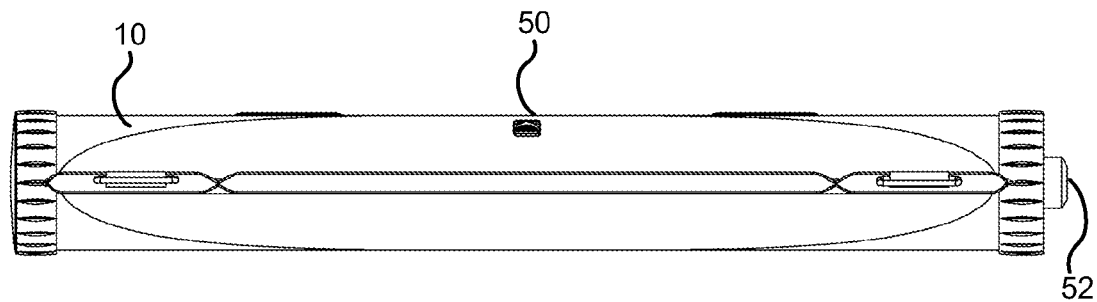
FIG. 2B is a front view of the baby changing system shown in FIG. 2A.

FIGS. 2A-2B show the front of the changing system in a retracted position. The changing system includes a mount including one or more mount mechanisms 12 for mounting the system in a fixed location, such as on the back of an automobile seat. The system also includes a locking mechanism for locking the hammock 20 in an extended position and preventing the hammock 20 from further extending or unwinding when weight is applied. In some embodiments, the locking mechanism also prevents retraction of the hammock 20 and/or any translation of the hammock 20. In the exemplary embodiment, the locking mechanism includes a toggle switch 50 for locking and unlocking the hammock 20. The toggle switch 50 is moved toward the front of the housing 10 to lock the hammock 20, and towards the back of the housing 10 to unlock the hammock 20. The exemplary embodiment also includes a release button 52 for retracting the hammock 20 into the housing 10. The hammock 20 and locking mechanism 10 are adapted to safely support the weight of an infant or child, e.g., at least 20 lbs. In some embodiments, the system supports at least 25 lbs., at least 30 lbs., and/or up to 35 lbs.

Figure 3A:
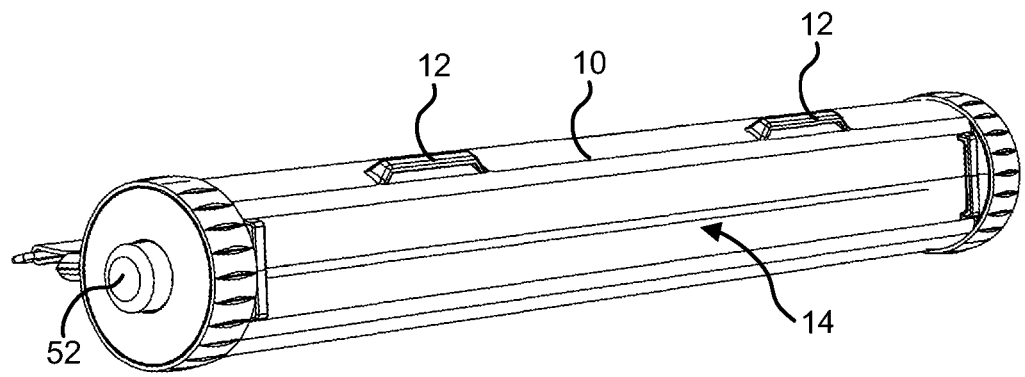
FIG. 3A is a rear perspective view of a baby changing system according to an exemplary embodiment of the present invention.
Figure 3B:
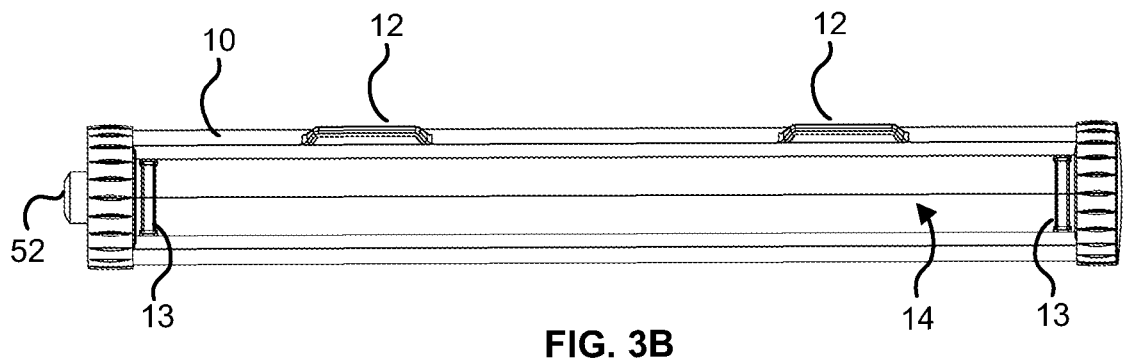
FIG. 3B is a rear view of the baby changing system shown in FIG. 3A.
Figure 4:
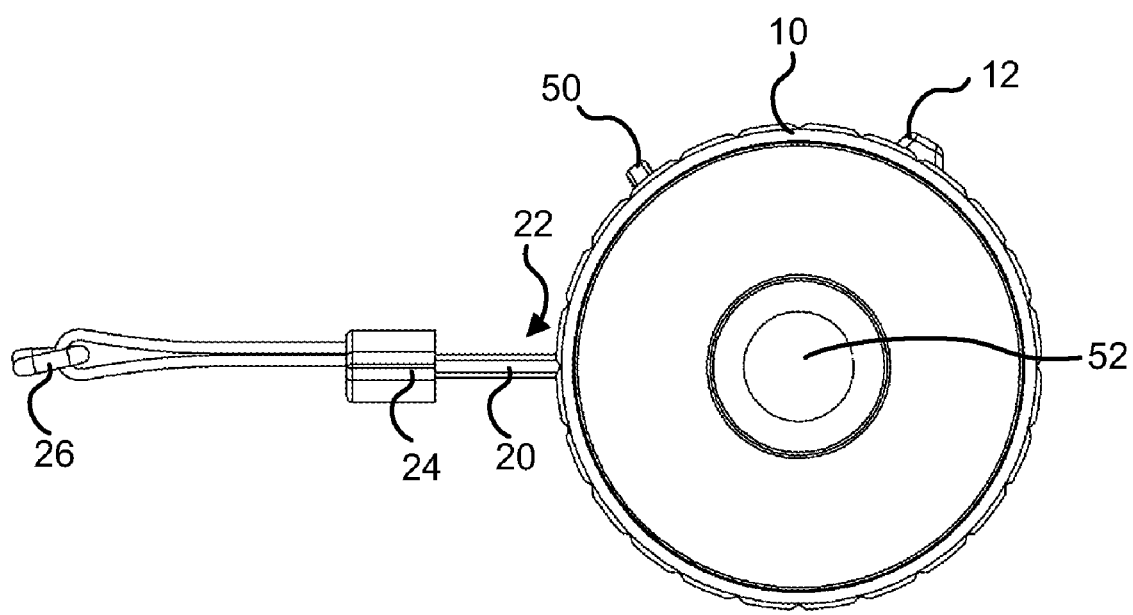
FIG. 4 is a side view of a baby changing system according to an exemplary embodiment of the present invention.

FIGS. 3A-3B show the back of the changing system. The housing 10 includes a back portion or face 14. In the exemplary embodiment, the back portion 14 is flat to rest against a mounting surface, such as the back of an automobile seat. As shown in FIGS. 3A-3B, the changing system may include additional mount mechanism 13. A side view of the changing system, illustrating the release button 52, is shown in FIG. 4.

Figure 5:
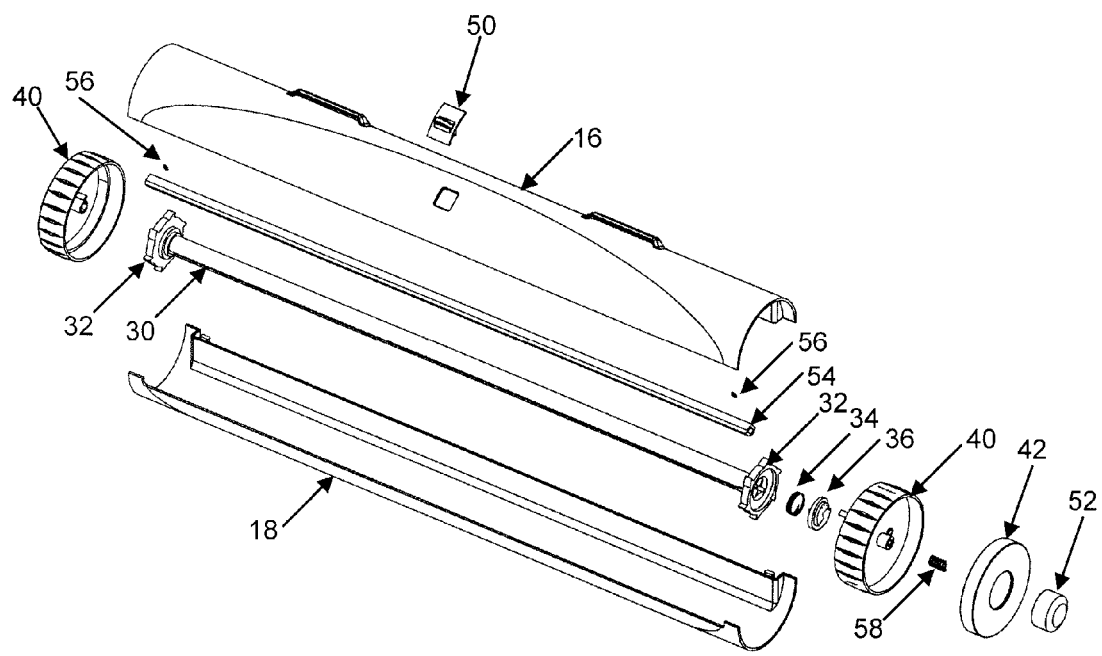
FIG. 5 is an exploded front perspective view of a baby changing system according to an exemplary embodiment of the present invention.

FIG. 5 is an exploded view of a changing system according to an exemplary embodiment of the present invention. The housing 10 of the changing system may include a top portion 16 and a bottom portion 18. In the exemplary embodiment, the system also includes a roller or tube 30 with locking gears 32. A lock 54 is connected to the toggle switch 50 and meshes between teeth of the gears 32 when the locking mechanism is activated to prevent rotation of the roller 30. The locking mechanism may further include springs 56 to bias the lock 54.

The hammock 20 is wound about the roller 30 in a storage position. The roller 30 includes a retraction mechanism including one or more spring end plugs 34, the release button 52, and release button springs 58. The changing system may further include two end caps 40, end plugs 36, and end caps 42.

Figure 6A:
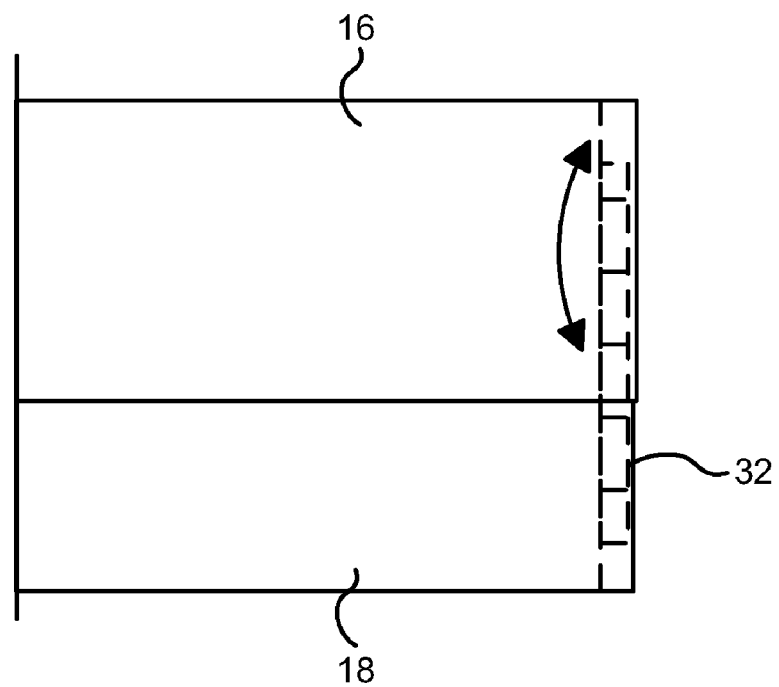
FIGS. 6A-6B illustrate a locking mechanism of a baby changing system according to an exemplary embodiment of the present invention.
Figure 6B:
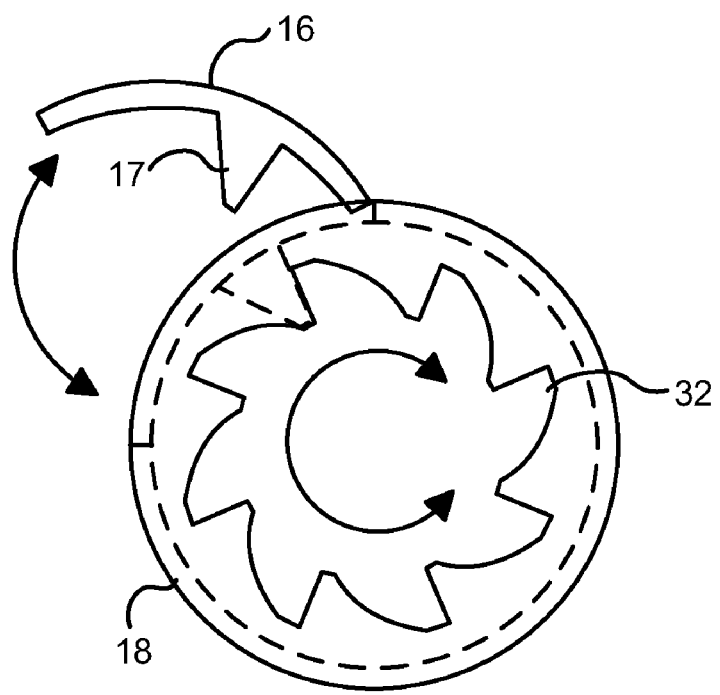

FIGS. 6A-6B illustrate an alternative locking mechanism of the changing system. In the exemplary embodiment, the changing system includes a top portion 16 that is hinged and includes one or more teeth 17 on one or both sides of the top portion 16. The teeth 17 of the top portion 16 mesh with teeth of gears 32 to prevent rotation of the roller 30. In another alternative embodiment, the gears 32 are not required and the top portion 16, or the lock 54, directly contacts the hammock 20 in the housing 20 to prevent extension of the hammock 20.

Figure 7A:
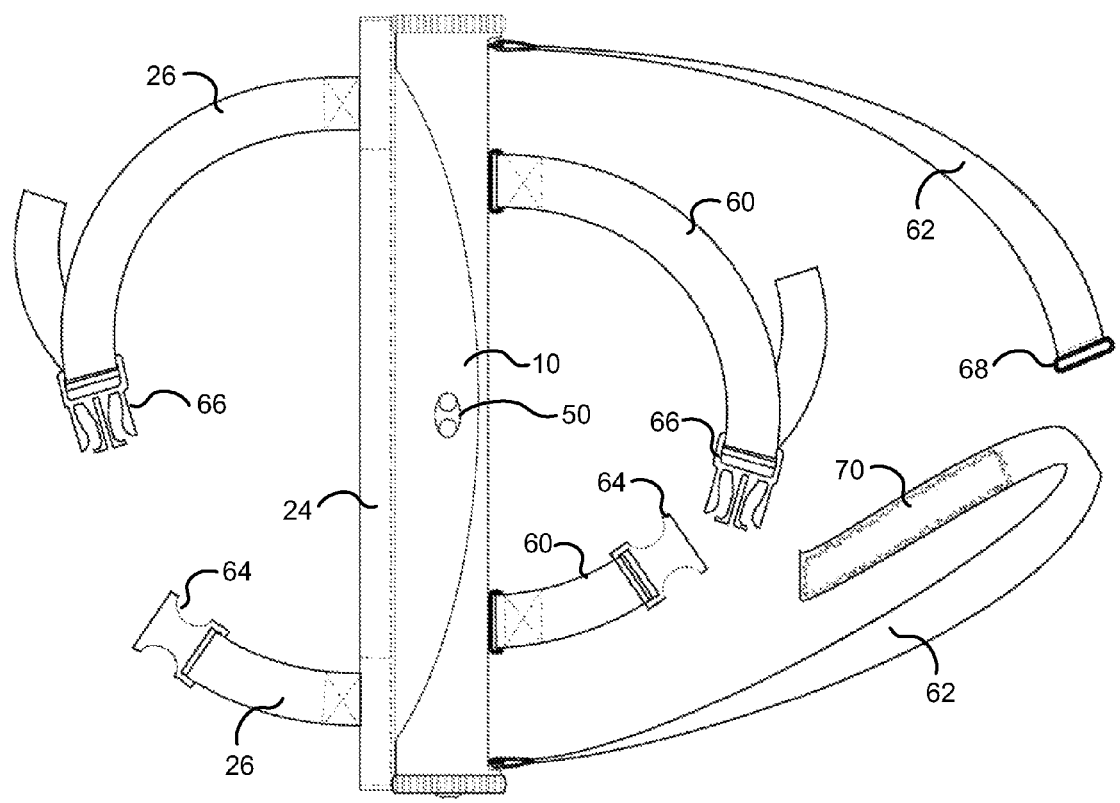
FIG. 7A is a top view of a baby changing system according to an exemplary embodiment of the present invention.
Figure 7B:
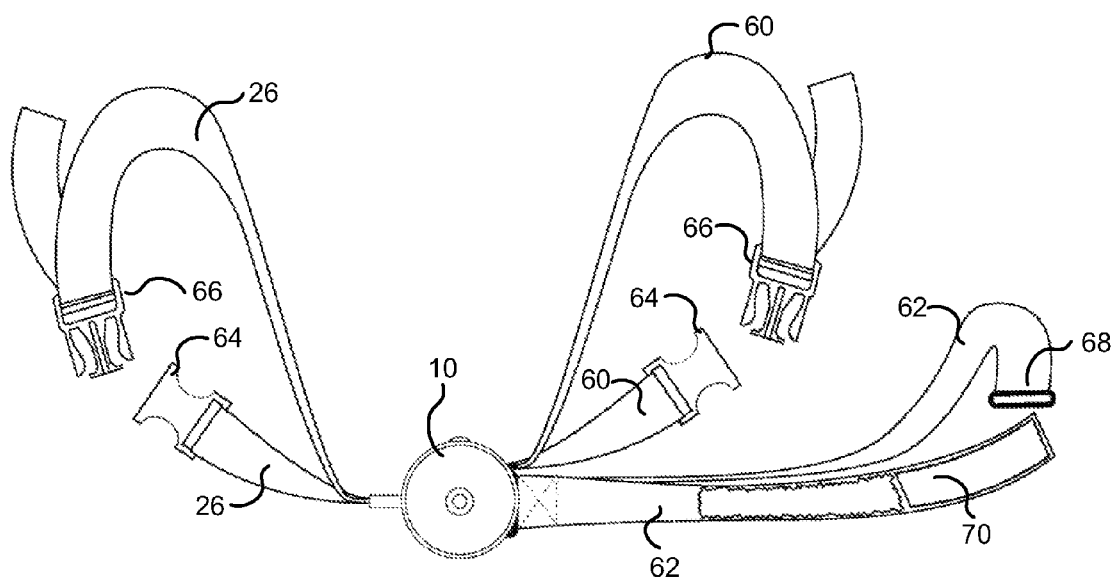
FIG. 7B is a side view of the baby changing system shown in FIG. 7A.

FIGS. 7A-7B illustrate the changing system according to the present invention with straps or tethers for mounting the housing 10 and attaching the hammock 20 in the extended position. The changing system includes straps 60 and 62 to mount the housing 10. In the exemplary embodiment, one of the straps 60 includes a buckle 64/66. The second strap 62 connects through a loop 68 with fastening tape 70 (e.g., Velcro). The changing system further includes attachment mechanisms or straps 26 including a buckle 64/66 to connect the hammock 20. The straps 26 may connect to or about a headrest 201 of a rear automobile seat, to or about a child seat on the rear automobile seat, or to a LATCH anchor installed in the vehicle. In other embodiments, the attachment mechanisms 26 include brackets, clips, fasteners, and/or other suitable attachment mechanisms.

The straps 26/60/62 are preferably adjustable to accommodate any number of different automobiles and obstacles. For example, the straps 60/62 on the housing 10 may be adjusted to ensure that the housing 10 hangs at a height suitable for the extended hammock 20 to clear any obstacle such as a child's car seat 202.

Figure 8A:
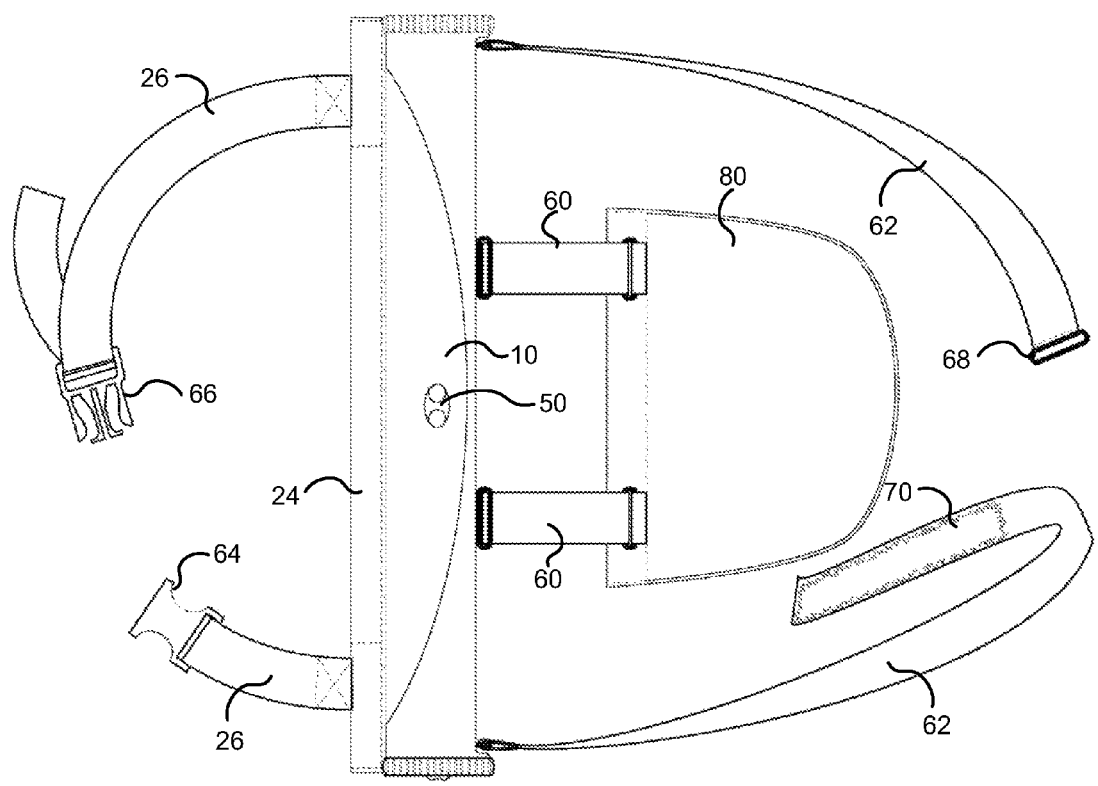
FIG. 8A is a top view of a baby changing system according to an exemplary embodiment of the present invention.
Figure 8B:
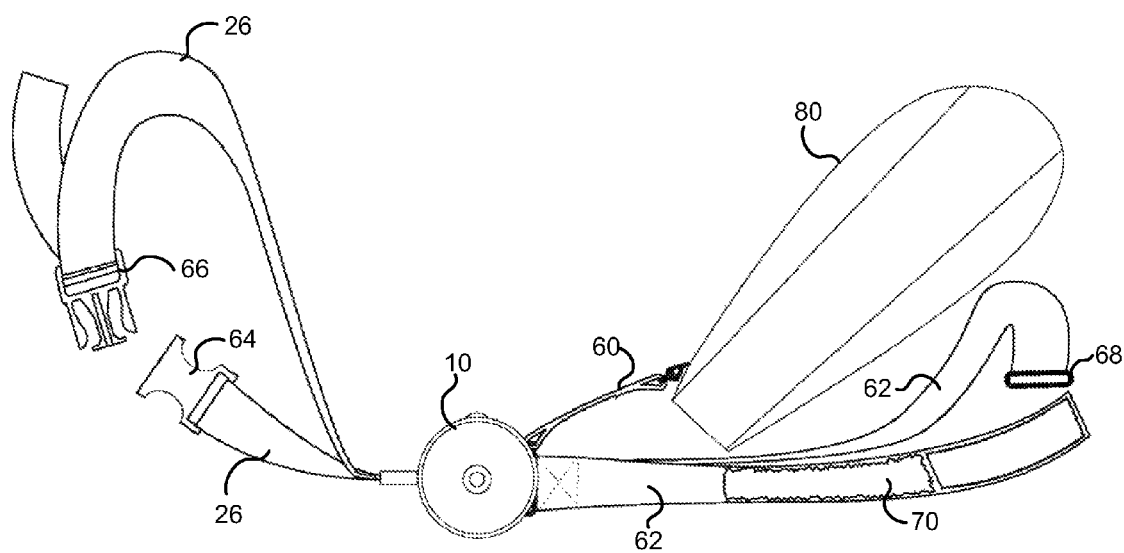
FIG. 8B is a side view of the baby changing system shown in FIG. 8A.

FIGS. 8A-8B illustrate the changing system with headrest cover 80 for mounting the housing 10. The headrest cover 80 fits over a headrest 201 of a front automobile seat to secure the housing against or below the back of the headrest 201. The headrest cover 80 is preferably made of a flexible material. In some embodiments, the headrest cover 80 is made of an elastic or stretchable material, such as Neoprene, to stretch over the headrest 201. In other embodiments, the headrest cover 80 is fitted to the headrest 201 and includes a zipper or other means to removeably attach the headrest cover 80. In some embodiments, the changing system includes a second headrest cover 80 in place of the attachment mechanisms 26 to connect to a rear seat headrest 201 and secure the hammock 20 in the extended position.

The above described FIGS. 7A-8B illustrate only two exemplary means to mount the changing system however any number of other suitable means may be used. For example, the changing system may include a mount with hooks for securing about the headrest posts 203 of the front automobile seat, or a mounting plate extending from the back of the housing 10 including holes (e.g., two holes) through which the headrest posts 203 extend to secure the changing system. In an alternative embodiment, the housing 10 may also be fixed to the back of the front automobile seat by fasteners, such as screws or bolts.

Figure 9A:
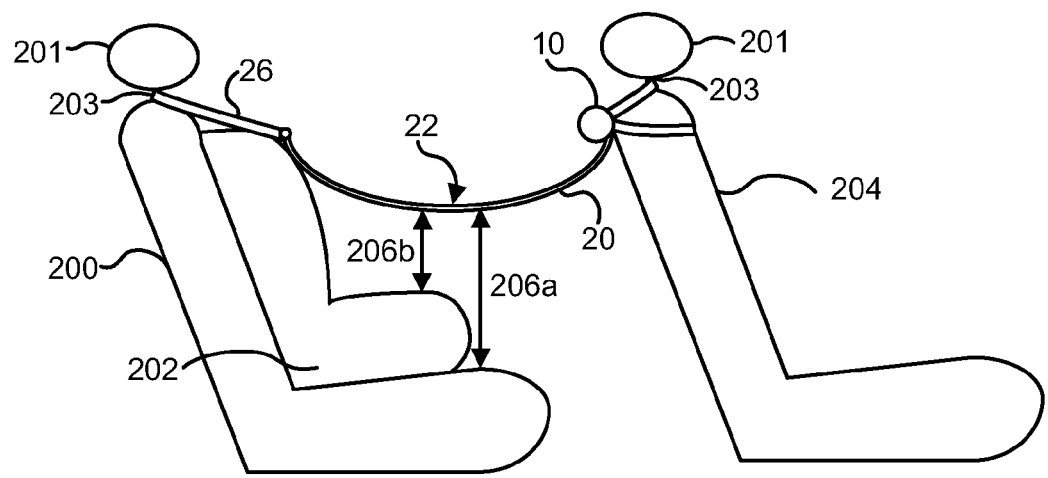
FIGS. 9A-9B are side views of a baby changing system according to an exemplary embodiment of the present invention in an automobile.
Figure 9B:
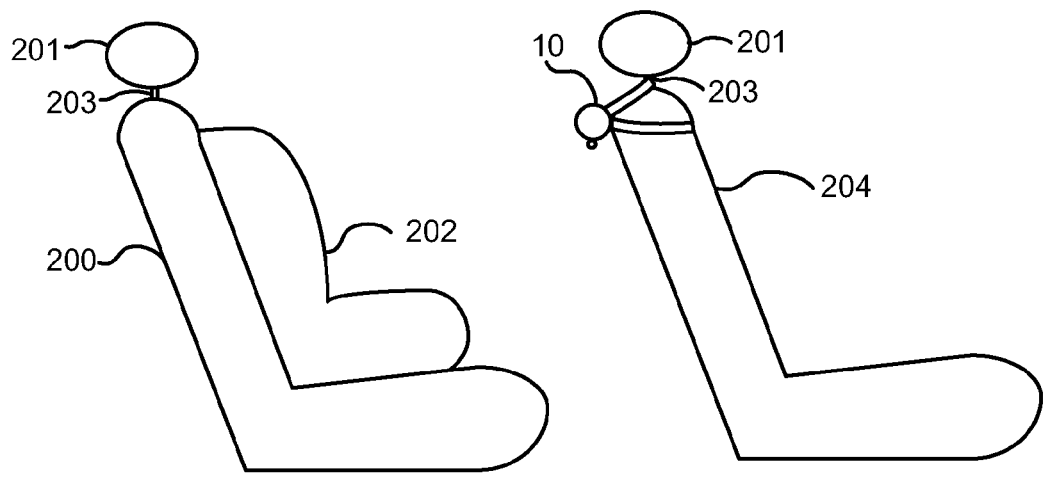

FIGS. 9A-9B are side views of the changing system installed in an automobile. The housing 10 is attached to a back surface of a front automobile seat 204. The housing 10 is preferably mounted at a height that does not impede on the occupancy space of a rear seat passenger, or an infant seated in a car seat 202. As shown in FIG. 9A, the hammock 20 may be extended from the housing 10 and attached across the rear seat 200 of the automobile. The distal end 24 of the hammock 20 is removably attachable to or about the rear seat 200, a headrest 201 of the rear seat 200, and/or to the child seat 202.

The hammock 20 is suspended above the seating surface of the rear seat 200 in the extended position providing a vertical distance or clearance 206, defined between the hammock 20 and the seating surface (clearance 206a), and/or between the hammock 20 and any obstacles (clearance 206b). The clearance 206 advantageously allows for use of the changing system with and without obstacles, such as car seats 202, in place on the rear seat 200. The clearances may vary depending on the size and configuration of the automobile. In some embodiments, the clearance 206a is at least 6 inches. In other embodiments, the clearance 206a is at least 12 inches or more. The clearance 206b is any distance sufficient to keep the hammock 20 above the car seat 202 when the weight of an infant is applied and may vary based on the material of the hammock 20, and the configuration and dimensions of the vehicle.

The hammock 20 locks in an extended position by means of the locking mechanism in the housing 10 to enable a child to be rested on the hammock 20 for changing. The child may be rested lengthwise on the hammock 20, or across the hammock 20. The non-elastic or minimally elastic material of the hammock 20 and the locking mechanism of the hammock 20 enable the hammock 20 to safely hold the weight of a child while his/her diaper is being changed. The present invention safely supports the child elevated above any obstacles or the rear seat 200, so that child's diaper may be changed in the rear of an automobile even when car seats and other items are on the rear seat 200.

The natural upward angle of the distal and proximal ends of the hammock 20 in the extended position keeps a child safely in position while being changed, particularly when placed crosswise on the hammock 20. Unlike changing an infant on the seating surface of the rear seat 200, the changing system avoids the danger of a child falling into to the leg space between the rear seat 200 and backrest of the front vehicle seats 204, or sliding toward the back of the seating surface of the rear passenger seat 200.

The system is adaptable for use with the adult standing outside the vehicle or sitting on the rear seat 200, e.g., due to the placement of the system in the vehicle, the elevated height and forward/aft orientation. The child may be laid with his/her head toward the center of the vehicle for changing with the adult standing outside or vice versa if the adult is inside the vehicle. If desired, the child may also be laid lengthwise on the hammock 20, in either direction. The clearance and elevated height of the hammock 20 makes changing easier since it provides back relief to the person changing the child since the child lies higher on a hammock 20 than he/she would on a vehicle's rear seat 200 and the adult does not have to bend over the child to change the diaper.

When not in use, the system and housing 10 remain attached to the rear of the front seat 40 in a stowed position as shown in FIG. 9B. The housing 10 and hammock 20 are sufficiently small (e.g., 3 in.×22 in.) and lightweight to minimize any safety hazard if the system remains attached while the passenger vehicle is in use. The hammock 20 retracts within or about the housing 10, either manually (e.g., rotating the roller by hand or external crank) or by means of the retraction mechanism. For example, the hammock 20 may automatically retract about the roller 30 in the housing 10 after use by pressing the retraction button 52. Thus, the hammock 20 is ready to use immediately and does not require a user to first remove the system from storage in the trunk or otherwise. However if desired or necessary, the system and housing 10 could also be easily removed and stowed elsewhere in the vehicle.

Figure 10A:
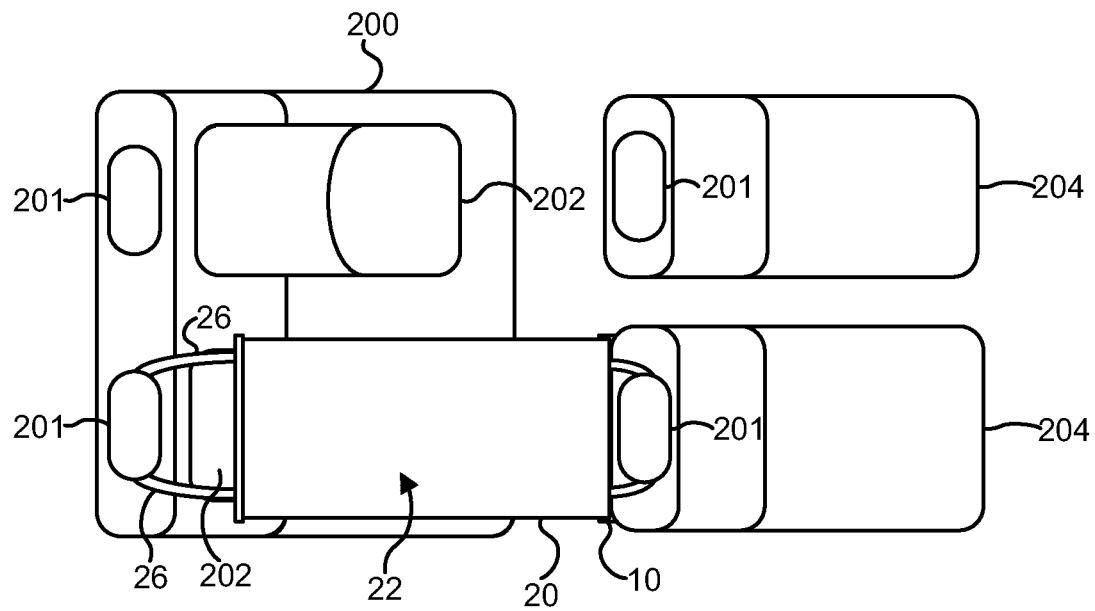
FIGS. 10A-10B are top views of a baby changing system according to an exemplary embodiment of the present invention in an automobile.
Figure 10B:
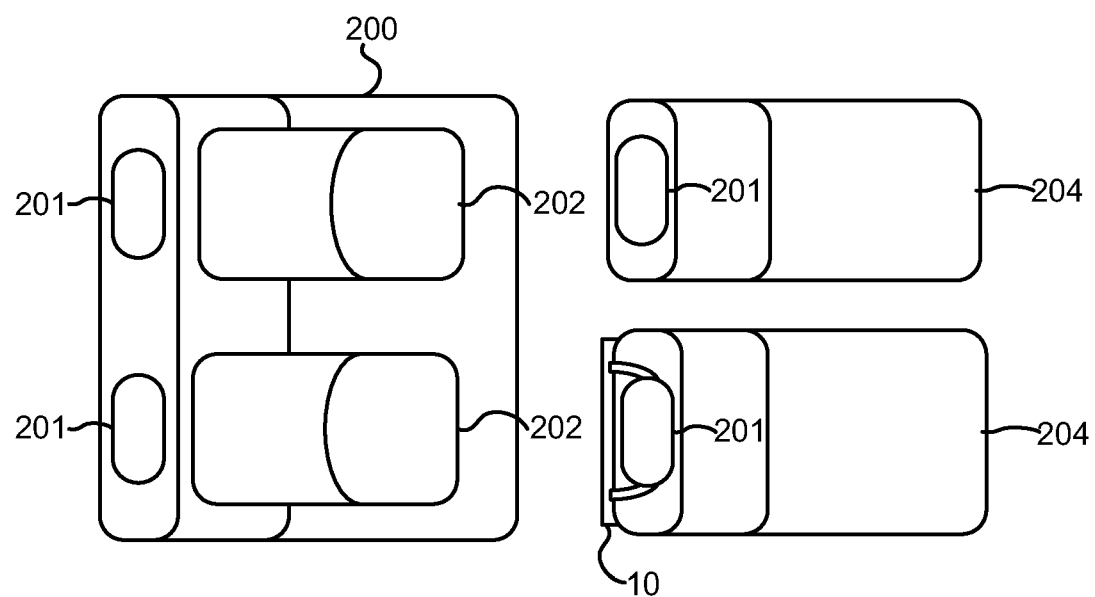

FIGS. 10A and 10B show top views of the baby changing system in extended and stowed positions. The system may be used on either or both sides of the vehicle in the rear seat area. In other embodiments, the system may also be used in the front seat of the vehicle, or in a rear cargo area of the vehicle. For example, the housing 10 may attach to the back of the rear seat 200, or to a side wall in the cargo compartment, to enable easy changing over the cargo area of an SUV or wagon.

The changing system may also be used outside of automobiles, such as at home or any other location where it is desired to use a retractable changing system that is elevated and/or provides clearance over obstacles. The changing system may further be used over a stroller, such as stroller including a snap-in infant carrier or a double stroller (e.g., tandem). For example, the housing 10 may attach a handle of the stroller and the attachment mechanisms 26 to a front end of the stroller or to the infant carrier snapped in the stroller.

Although the invention has been described with reference to a particular arrangement of parts, features and the like, these are not intended to exhaust all possible arrangements or features, and indeed many modifications and variations will be ascertainable to those of skill in the art.

What is claimed is:

1. A baby changing system, comprising:
   a housing including a mount connectable to a first automobile seat;
   a sheet extendable from said housing over and above a seating surface of a second automobile seat;
   a locking mechanism for fixing said sheet in two or more extended positions and preventing said sheet from further extension from said housing; and
   one or more attachments on a distal end of said sheet to secure said sheet over the seating surface, wherein said sheet is suspended above the seating surface in the at least one of the extended positions providing a clearance between said sheet and the seating surface.

2. A baby changing system, comprising:
   a housing including a mount connectable to a first automobile seat;
   a sheet extendable from said housing over and above a seating surface of a second automobile seat;
   a locking mechanism for fixing said sheet in an extended position;
   one or more attachments on a distal end of said sheet to secure said sheet over the seating surface, wherein said sheet is suspended above the seating surface in the extended position providing a clearance between said sheet and the seating surface;
   a roller within said housing; and
   a retraction mechanism to retract said sheet into said housing and about said roller.

3. The system according to claim 1, wherein said sheet supports a weight of at least twenty pounds in the extended positions.

4. The system according to claim 1, wherein said sheet comprises a flexible woven material that is substantially non-elastic.

5. The system according to claim 1, wherein said mount comprises two or more straps connectable about a portion of the first automobile seat.

6. The system according to claim 1, wherein said housing includes an interior cavity for storing said sheet in a retracted position.

7. The system according to claim 2, wherein said locking mechanism locks rotation of said roller.

8. The system according to claim 7, wherein said locking mechanism includes one or more gears attached to said roller and a lock displaceable against the one or more gears.

9. The system according to claim 8, wherein said locking mechanism includes one or more springs biasing the lock against the one or more gears.

10. The system according to claim 1, wherein said locking mechanism contacts said sheet and prevents translation of said sheet.

11. The system according to claim 1, wherein the distal end of said sheet includes a curved stiffener.

12. The system according to claim 1, wherein said sheet includes two longitudinal sides, wherein said sheet is curved in the extended positions such that the longitudinal sides are above a center of said sheet.

13. The system according to claim 1, wherein the seating surface of the second automobile seat includes at least one of a child seat and infant carrier base on the seating surface, wherein the sheet is suspended above the at least one of the child seat and the infant carrier base.

14. A baby changing system, comprising:
   a housing including a mount to fix the position of said housing, said housing including a roller;
   a continuous sheet connected to said housing, said sheet extendable from said housing and retractable about the roller;
   a locking mechanism for fixing said sheet in an extended and elevated position;
   one or more attachments on a distal end of said sheet to fix a position of the distal end;
   a retraction mechanism to retract said sheet into said housing and about the roller; and
   wherein said housing is fixed to a back portion of a first automobile seat, wherein said one or more attachments attach to a second automobile seat behind the first automobile seat, wherein said sheet is extendable over a portion of the second seat and lockable in the extended position elevated over the second seat by means of the locking mechanism, and wherein the sheet is retractable after use by means of the retraction mechanism.

15. The system according to claim 14, wherein said sheet is suspended above the seating surface in the extended position providing a clearance between said sheet and the seating surface.

16. A baby changing system, comprising:
a housing including a mount to fix the position of said housing, said housing including a roller;
a continuous sheet connected to said housing, said sheet extendable from said housing and retractable about the roller;
a locking mechanism for fixing said sheet in two or more extended and elevated positions and preventing said sheet from further extension from said housing;
one or more attachments on a distal end of said sheet to secure the distal end;
a retraction mechanism to retract said sheet into said housing and about the roller; and
wherein said sheet supports a weight of at least twenty pounds in the extended positions.

17. The system according to claim 16, wherein said sheet comprises a flexible woven material that is substantially non-elastic.

18. The system according to claim 16, wherein said locking mechanism includes one or more gears attached to the roller and a lock displaceable against the one or more gears.

19. The system according to claim 16, wherein said sheet includes two longitudinal sides, wherein said sheet is curved in the extended positions such that said longitudinal sides are above a center of said sheet.

20. A method of changing an infant in an automobile, comprising the steps of:
providing a changing system including a housing having a mount, a sheet extendable from the housing, one or more attachments on a distal end of said sheet, and a locking mechanism for fixing the sheet in two or more extended positions;
extending the sheet from the housing over and above a seating surface of an automobile seat;
locking the sheet in one of the extended positions via the locking mechanism to prevent the sheet from further extending from the housing;
attaching the sheet over the seating surface of the automobile seat via the attachments, wherein the sheet is suspended above the seating surface; and
placing the infant on the extended sheet.

21. The method according to claim 20, wherein the automobile seat includes at least one of a child seat and infant carrier base on the seating surface, wherein the sheet is suspended above the at least one of a child seat and infant carrier base.

22. A baby changing system, comprising:
a housing including a mount to fix the position of said housing, said housing including a roller;
a continuous sheet connected to said housing, said sheet extendable from said housing and retractable about the roller;
a locking mechanism for fixing said sheet in two or more extended and elevated positions and preventing said sheet from further extension from said housing;
one or more attachments on a distal end of said sheet to secure the distal end;
a retraction mechanism to retract said sheet into said housing and about the roller; and
wherein said sheet is extendable over a seating surface, wherein the seating surface includes at least one of a child seat and infant carrier base on the seating surface, wherein said sheet is suspended above the at least one of the child seat and the infant carrier base.

* * * * *